United States Patent
Endo et al.

(10) Patent No.: US 7,512,876 B2
(45) Date of Patent: Mar. 31, 2009

(54) BROWSER PROGRAM FOR PERFORMING TABLE-LAYOUT

(75) Inventors: Masaya Endo, Tokyo (JP); Michimasa Uematsu, Tokyo (JP)

(73) Assignee: Access Company, Ltd., Tokyo (JP)

( * ) Notice: Subject to any disclaimer, the term of this patent is extended or adjusted under 35 U.S.C. 154(b) by 517 days.

(21) Appl. No.: 10/545,563

(22) PCT Filed: Feb. 13, 2004

(86) PCT No.: PCT/JP2004/001606

§ 371 (c)(1),
(2), (4) Date: Aug. 11, 2005

(87) PCT Pub. No.: WO2004/072867

PCT Pub. Date: Aug. 26, 2004

(65) Prior Publication Data

US 2006/0168506 A1   Jul. 27, 2006

(30) Foreign Application Priority Data

Feb. 14, 2003 (JP) .............................. 2003-036279

(51) Int. Cl.
*G06F 17/00* (2006.01)
(52) U.S. Cl. ....................... 715/227; 715/234
(58) Field of Classification Search ................ 715/509, 715/227, 513, 500, 501.1, 200, 234, 205
See application file for complete search history.

(56) References Cited

U.S. PATENT DOCUMENTS

| | | | |
|---|---|---|---|
| 6,226,642 B1 * | 5/2001 | Beranek et al. ............... 707/10 |
| 6,389,437 B2 | 5/2002 | Stoub | |
| 6,675,351 B1 * | 1/2004 | Leduc ........................ 715/264 |
| 6,857,102 B1 * | 2/2005 | Bickmore et al. ........... 715/205 |
| 2002/0107894 A1 * | 8/2002 | Kent et al. .................. 707/517 |
| 2003/0028560 A1 * | 2/2003 | Kudrolli et al. ............. 707/509 |

(Continued)

FOREIGN PATENT DOCUMENTS

EP   0949571   10/1999

(Continued)

OTHER PUBLICATIONS

Japanese Office Action drafted Dec. 13, 2007, for Japanese Application No. 2004-033247 filed Feb. 10, 2004, 3 pages. (English translation attached, 2 pages).

(Continued)

*Primary Examiner*—Thu Huynh
(74) *Attorney, Agent, or Firm*—Morrison & Foerster LLP

(57) ABSTRACT

There is provided a method of laying out contents targeted for a first device having a first screen size on a screen of a second device having a second screen size smaller than the first screen size. The method includes analyzing a table width of the table in accordance with a predetermined criterion; and performing in response to a result of the analyzing step one of layout operations of: (p1) laying out the table using a typical technique in accordance with the second screen size, and (p2) laying out a row of cells in the table so that at least two cells arranged adjacently in a horizontal direction in the row of the table are aligned horizontally on the screen of the second device based on a predetermined algorithm.

33 Claims, 13 Drawing Sheets

U.S. PATENT DOCUMENTS

2003/0101203 A1* 5/2003 Chen et al. .................. 707/513
2004/0148571 A1* 7/2004 Lue ........................... 715/514

FOREIGN PATENT DOCUMENTS

| | | |
|---|---|---|
| JP | 09-009160 | 1/1997 |
| JP | 2000-115527 | 4/2000 |
| JP | 2000-298543 | 10/2000 |
| JP | 2001-243151 | 9/2001 |
| JP | 2002-007269 | 1/2002 |
| WO | WO-01/57611 | 8/2001 |
| WO | WO-01/65354 | 9/2001 |
| WO | WO-02/087135 | 10/2002 |

OTHER PUBLICATIONS

International Search Report mailed Jun. 4, 2004, for International Patent Application No. PCT/JP2004/001606, filed Feb. 13, 2004, 3 pages.

* cited by examiner

```
<HTML>
<head>
<base href = "http://www.access.co.jp/newimages/" >
</head>
<body>
<table border>
<tr>
<td>
<img src = "aaa_b.gif" >
In the beginning of the 21th century, a leading player in the Internet is changing from a PC to an Internet appliance. An environment surrounding
the Internet is facing a big change against the back ground of the fast growth of the mobile and wireless market and the arrival of a new era of
the broadband communication.
</td>
<td>
<img src = "aaa_b.gif" >
In the beginning of the 21th century, a leading player in the Internet is changing from a PC to an Internet appliance. An environment surrounding
the Internet is facing a big change against the back ground of the fast growth of the mobile and wireless market and the arrival of a new era of
the broadband communication.
</td>
<td>
<img src = "aaa_b.gif" >
In the beginning of the 21th century, a leading player in the Internet is changing from a PC to an Internet appliance. An environment surrounding
the Internet is facing a big change against the back ground of the fast growth of the mobile and wireless market and the arrival of a new era of
the broadband communication.
</td>
</body>
</table>
</HTML>
```

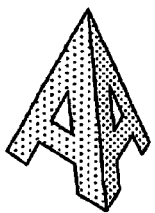

ACCESS Advanced Alliance

In the beginning of the 21th century, a leading player in the Internet is changing from a PC to an Internet appliance. An environment surrounding the Internet is facing a big change against the back ground of the fast growth of the mobile and wireless market and the arrival of a new era of the broadband communication.

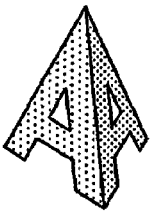

ACCESS Advanced Alliance

In the beginning of the 21th century, a leading player in the Internet is changing from a PC to an Internet appliance. An environment surrounding the Internet is facing a big change against the back ground of the fast growth of the mobile and wireless market and the arrival of a new era of the broadband communication.

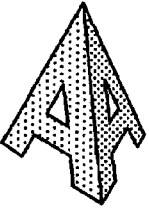

ACCESS Advanced Alliance

In the beginning of the 21th century, a leading player in the Internet is changing from a PC to an Internet appliance. An environment surrounding the Internet is facing a big change against the back ground of the fast growth of the mobile and wireless market and the arrival of a new era of the broadband communication.

FIG. 9

```
<HTML>
<head>
<base href = "http://www.access.co.jp/newimages/">
</head>

<table cellspacing = 0 cellpadding = 0 border = 0>
<tr>
<td><img src = "a1.gif"><td><img src = "a2.gif"><td><img src = "a3.gif"><td><img src = "a4.gif"><td><img src = "a5.gif">
<tr>
<td><img src = "b1.gif"><td><img src = "b2.gif"><td><img src = "b3.gif"><td><img src = "b4.gif"><td><img src = "b5.gif">
<tr>
<td><img src = "c1.gif"><td><img src = "c2.gif"><td><img src = "c3.gif"><td><img src = "c4.gif"><td><img src = "c5.gif">
</table>

</HTML>
```
⤺70

FIG.11

BROWSER PROGRAM FOR PERFORMING TABLE-LAYOUT

CROSS REFERENCE TO RELATED APPLICATIONS

This application is a 35 U.S.C. §371 filing of International Patent Application No. PCT/JP2004/001606, filed Feb. 13, 2004, titled BROWSER PROGRAM FOR PERFORMING TABLE-LAYOUT, which claims the benefit of Japanese Application No. 2003-036279, titled BROWSER PROGRAM FOR PERFORMiNG TABLE-LAYOUT, filed Feb. 14, 2003, which is incorporated herein by reference in its entirety.

FIELD OF THE INVENTION

The present invention relates to a browser used for browsing contents on the Internet, and particularly to a layout method of laying out a table in the contents.

BACKGROUND OF THE INVENTION

Recently, with the widespread use of the Internet as a background, user demands for browsing contents described by a markup language such as an HTML (hypertext markup language) on a portable device such as a mobile phone and a PDA (personal digital assistant) are now increasing.

Typically, the contents on the Internet are targeted for a personal computer having a relatively large screen which is larger than a screen size of the portable device. That is, the contents targeted for the personal computer include images and tables whose sizes are larger than the screen size of the portable device. For this reason, in many cases, the portable device having a relatively small screen can not suitably display the contents of the Internet on the screen thereof.

The table, which is defined in the contents by a tag <table>, is used to lay out cells of the table in a form of a two-dimensional array on a device. In addition, by utilizing the table, a relatively large image can be displayed on the screen of a device as a combinational image consisting of a plurality of cells of partial images.

A method of browsing contents targeted for the personal computer using the portable device having relatively small screen has been proposed. This method includes aligning cells, which are aligned horizontally (i.e., in a direction of a row) in a table of the contents, vertically on the screen of the portable device. By adopting the method, the browser running on the portable device enables a user to browse the cells on the relatively small screen of the portable device by scrolling vertically the cells by operating, for example, an up-and-down key.

However, if the cells, which are aligned horizontally in original contents, are aligned on the screen of the portable device vertically, the significance of alignment of the cells which are aligned in the original contents in a form of a two-dimensional array may be lost.

Japanese Patent Provisional Publications No. HEI 9-9160 (document 1) and No. 2001-243151 (document 2) disclose a technique to scale down an image in original contents in accordance with the screen size of the portable device. By adopting the technique disclosed in the documents 1 and 2, the browser running on the portable device can display the image of the original contents within the screen of the portable device. However, in the documents 1 and 2, no explanation is made on how to display a table on the relatively small screen of the portable device without losing the significance that the two-dimensional array of the table has.

Another factor that inhibits comfortable browsing of the contents targeted for the personal computer on the portable device is a "frameset" which is defined in the contents by a set of tags <frameset> and </frameset>. The tag <frameset> is a declaration statement used to divide the screen into a plurality of frames to display different contents on the respective frames. In the frameset, contents having a URL (uniform resource locator) designated by a tag <frame src="..."> are displayed in one frame.

Similarly to the table defined by the tag <table>, by using the frameset, contents can be displayed on a screen of a device in a form of a two-dimensional array. However, in a case where the contents including the frameset are displayed by the browser on the relatively small screen of the portable device, one of URL contents designated by the tag <frame src="..."> is displayed in a small section (i.e., one frame) of the relatively small screen of the portable device. In this case, the URL content may be difficult to be read. That is because the browser running on the portable device simply divides the screen into a plurality of frames and arranges the frames in a form of a two-dimensional array in accordance with tags <frame cols=","> and <frame rows=","> described in the frameset.

That is, a screen size per a frame becomes very small when the frameset is displayed by the browser on the relatively small screen of the portable device.

Japanese Patent Provisional Publication No. 2000-298543 (document 3) discloses a method to indicate an active frame of a plurality of frames by a heavy line, and to use a frame switching key to switch between the frames when the frameset is displayed by a browser on a computer.

By adopting the technique disclosed in the document 3, the browser enables the user to recognize the active frame visually and to switch to a desired frame relatively easily by using the frame switching key. However, in the document 3, no explanation is made on how to display the frameset on the relatively small screen of the portable device without losing the significance that the two-dimensional array of the frames of the frameset has.

SUMMARY OF THE INVENTION

The present invention is advantageous in that it provides a method of laying out contents of the Internet on a relatively small screen of a portable device without losing a significance that a linear array or a two-dimensional array of data included in the contents such as a table, a frameset and the like has.

According to an aspect of the invention, there is provided a method of laying out contents targeted for a first device having a first screen size on a screen of a second device having a second screen size smaller than the first screen size. The method includes: analyzing a table defined by a tag <table> in the contents to determine a table width of the table in accordance with a predetermined criterion; and performing in response to a result of the analyzing step one of layout operations of:

(p1) laying out the table using a typical technique in accordance with the second screen size, and (p2) laying out a row of cells in the table so that at least two cells arranged adjacently in a horizontal direction in the row of the table are aligned horizontally on the screen of the second device based on a predetermined algorithm.

With this configuration, even if the contents targeted for the first device (e.g., a personal computer) include a table, the table can be displayed on the second device (e.g., a portable device) without losing significance that the linear array or the two-dimensional array of the information has.

Optionally, the layout operations may include (p3) scaling down the table configured to be a combinational image having a plurality of partial images so that the combinational image can be contained in the screen of the second device at least in a horizontal direction.

Still optionally, the predetermined criterion may include a first criterion that whether or not a condition:

(a minimum table width)>(a width of the screen of the second device)

is satisfied, the minimum table width of the table being a width of a row in the table when cells of the row of the table is minimized. In this case, when the first criterion is not satisfied, the operation of (p1) is performed. Further, when the first criterion is satisfied, one of the operations of (p2) and (p3) is performed.

Still optionally, the predetermined criterion may include a second criterion that a number of carriage returns of characters in at least one of cells of a row of the table is greater than a certain value when the cells of the row of the table are minimized. In this case, when the second criterion is satisfied, one of the operations of (p2) and (p3) is performed even if the first criterion is not satisfied.

Still optionally, the predetermined criterion may include a third criterion that a ratio of a vertical size to a horizontal size of at least one of cells of a row of the table is grater than a certain ratio when the cells of the row of the table are minimized. In this case, when the third criterion is satisfied, one of the processes of (p2) and (p3) is selected even if the first criterion is not satisfied.

Still optionally, the predetermined criterion may include a fourth criterion that a width of at least one of cells having characters in a row of the table is less than or equal to a certain value when the cells of the row of the table are minimized. In this case, when the forth criterion is satisfied, one of the operations of (p2) and (p3) is performed even if the first criterion is not satisfied.

In a particular case, the method may includes determining whether the table is configured to be the combinational image. In this case, the operation (p3) is performed when the table is determined to be the combinational image by the determining step.

Optionally, in the determining step, when a ratio of a number of cells having images to a number of all cells of the table is greater than a certain ratio, the table may determined to be the combinational image.

In a particular case, the predetermined algorithm may include operations of:

(a1) aligning the at least two cells arranged adjacently in the horizontal direction in the row of the table on a row of the screen of the second device, (a2) aligning remaining cells of the at least two cells, that can not be aligned on the row of the screen of the second device, on another row of the screen of the second device, and (a3) performing the operations of (a1) and (a2) with respect to all rows of the table.

In a particular case, the minimum table width may be a sum of widths of images in cells of the row of the table, a maximum of widths of characters in each cell of the row of the table, and widths of borders between adjacent cells of the row of the table.

In a particular case, the operation (p3) may include: (b1) scaling down cells of the table by the same scaling factor in accordance with the second screen size, and (b2) scaling down each of partial images of the cells of the table in accordance with a width of a corresponding scaled down cell.

Optionally, the method may include converting in advance a frameset to a table in accordance with a predetermined conversion algorithm if the frameset exists in the contents.

Still optionally, the method may include obtaining in advance the contents through a network.

Still optionally, the method may include obtaining in advance the contents through the Internet.

Still optionally, the contents may include a document described by a markup language.

According to another aspect of the invention, there is provided a computer program product providing a set of instructions executed by a terminal device, the terminal device executing the instructions functioning as laying out contents targeted for a device having a first screen size on a screen of the terminal device having a second screen size smaller than the first screen size. The computer program product includes functions of:

obtaining the contents through a network;

analyzing a table defined by a tag <table> in the contents to determined a table width of the table in accordance with a predetermined criterion; and performing, in response to a result of the analyzing, one of layout operations of:

(p1) laying out the table using a typical technique in accordance with the second screen size, and (p2) laying out a row of cells in the table so that at least two cells arranged adjacently in a horizontal direction in the row of the table are aligned horizontally on the screen of the terminal device based on a predetermined algorithm.

With this configuration, even if the contents targeted for the device (e.g., a personal computer) include a table, the table can be displayed on the terminal device (e.g., a portable device) without losing significance that the linear array or the two-dimensional array of the table has.

According to another aspect of the invention, there is provided a terminal device for laying out contents targeted for a device having a first screen size on a screen of the terminal device having a second screen size smaller than the first screen size. The terminal device includes an analyzing system that analyzes a table defined by a tag <table> in the contents to determined a table width of the table in accordance with a predetermined criterion, and a layout system that performs in response to a result of an analysis of the analyzing system one of layout operations of:

(p1) laying out the table using a typical technique in accordance with the second screen size, (p2) laying out a row of cells in the table so that at least two cells arranged adjacently in a horizontal direction in the row of the table are aligned horizontally on the screen of the terminal device based on a predetermined algorithm, and (p3) scaling down the table configured to be a combinational image having a plurality of partial images so that the combinational image can be contained in the screen of the terminal device at least in a horizontal direction.

With this configuration, even if the contents targeted for the device (e.g., a personal computer) include a table, the table can be displayed on the terminal device (e.g., a portable device) without losing significance that the linear array or the two-dimensional array of the information has.

Optionally, the terminal device may include an obtaining system that obtains the contents through a network.

BRIEF DESCRIPTION OF THE DRAWINGS

The present invention will be understood and appreciated from the following detailed description, taken in conjunction with the drawings in which:

FIG. 4 is an example of a HTML document including a table;

FIG. 8 shows a comparative example of the screen image of the HTML document of FIG. 4 treated by another process for comparing with the example of FIG. 7;

FIG. 9 shows another comparative example of the screen image of the HTML document of FIG. 4 treated by another process for comparing with the example of FIG. 7;

FIG. 11 is an example of contents including a table as a combinational image;

DETAILED DESCRIPTION OF THE EMBODIMENT

Hereinafter, embodiments of the invention will be described with reference to the accompanying drawings.

First Embodiment

Figure 1:
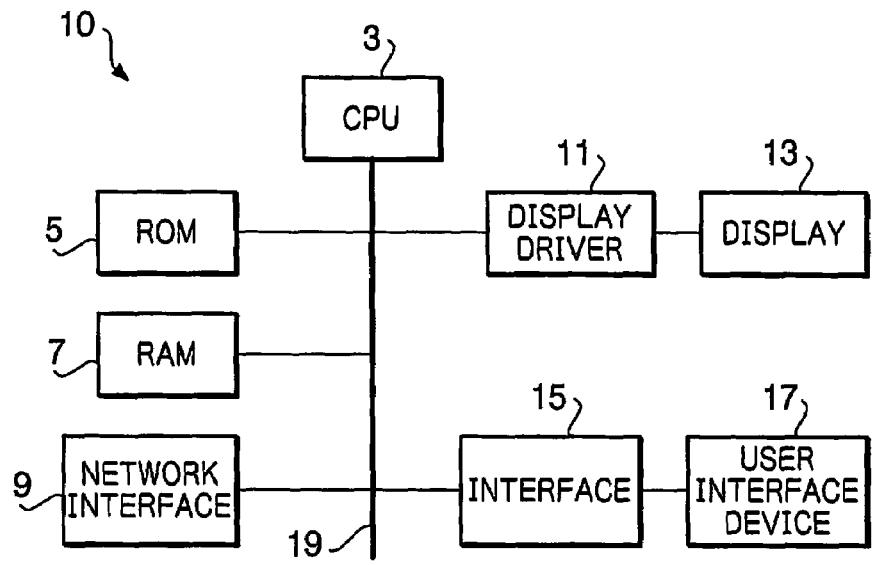
FIG. 1 shows a block diagram of a potable device according to a first embodiment of the invention.

FIG. 1 shows a block diagram of a portable device 10 according to a first embodiment of the invention. The portable device 10 has a display 13 whose screen size is smaller than that of a personal computer. For example, if the personal computer is defined as a device having a horizontal screen size of 800 pixels, the portable device 10 may be, for example, a mobile phone having a horizontal screen size of 100 through 200 pixels, a PDA having a horizontal screen size of 150 through 640 pixels, or a car navigation device having a horizontal screen size smaller than 640 pixels. In the first embodiment, the portable device 10 is regarded as a mobile phone having a horizontal screen size of 200 pixels by way of example.

As shown in FIG. 1, the portable device 10 includes a CPU (Central Processing Unit) 3 which controls various operation of the portable device. Further, the portable device 10 includes a ROM (Read-Only Memory) 5, a RAM (Random-Access Memory) 7, a network interface 9, a display driver 11 and an interface 15 which are connected to the CPU 3 via a bus 19. Further, the portable device 10 has a display 13 which has the horizontal screen size of 200 pixels and which is connected to the display driver 11, and has a user interface device 17 such as an operation panel including an up-and-down key and numeric keys. The user interface device 17 is also connected to the CPU 3 via the interface 15.

The ROM 5 stores various programs including a program of a browser 20 which is initiated when a certain key operation is made by a user through the use of the user interface device 17.

Figure 2:
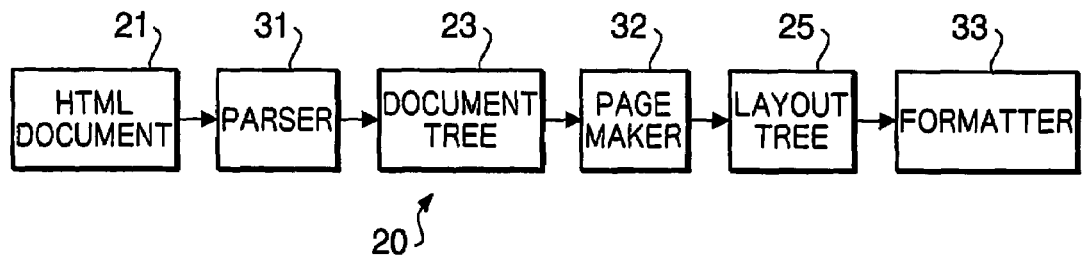
FIG. 2 shows a functional block diagram of a browser that runs under a control of a CPU of the portable device.

FIG. 2 shows a functional block diagram of the browser 20 that runs under the control of the CPU 3. As shown in FIG. 2, the browser 20 has functional blocks of parser 31, a page maker 32 and a formatter 33.

The parser 31 parses an HTML document 21 (i.e., contents) that is obtained from the Internet via the network interface 9 so as to make a document tree 23 in which a grammatical structure of the HTML document 21 is expressed by a tree structure. It should be noted that the document tree 23 only expresses the grammatical structure of the HTML document 23, and does not include information of presentation of the HTML document 23.

Next, based on the document tree 23 and information about tags, the page maker 32 makes a layout tree 25 in which forms of presentation of the HTML document 21, for example, block, inline, table, list, item and the like are included. That is, the layout tree 25 includes information about the order of the data such as block, inline, table and the like in the HTML document 21. It should be noted that the layout tree 25 does not include information about positions and sizes of such items (block, inline, table, etc.) on the screen of the display 13.

Based on the layout tree 25 and information concerning the screen size of the display 13, the formatter 33 lays out the items on the screen of the display 13. That is, the formatter 33 arranges the items in the layout tree 25 on the screen of the display 13, and determines positions, widths and heights of the items and positions of carriage returns in characters of items.

Through such processes performed by the parser 31, the page maker 32 and the formatter 33, the HTML document 21 is displayed on the screen of the display 13.

Further, the formatter 30 of the browser 20 is configured to carry out a table-layout process when contents targeted for the personal computer includes a table. That is, the table-layout process enables to lay out and to display contents targeted for the personal computer on the screen of the portable device 10 without losing significance that a two-dimensional array or a linear array of the table has.

Figure 3:
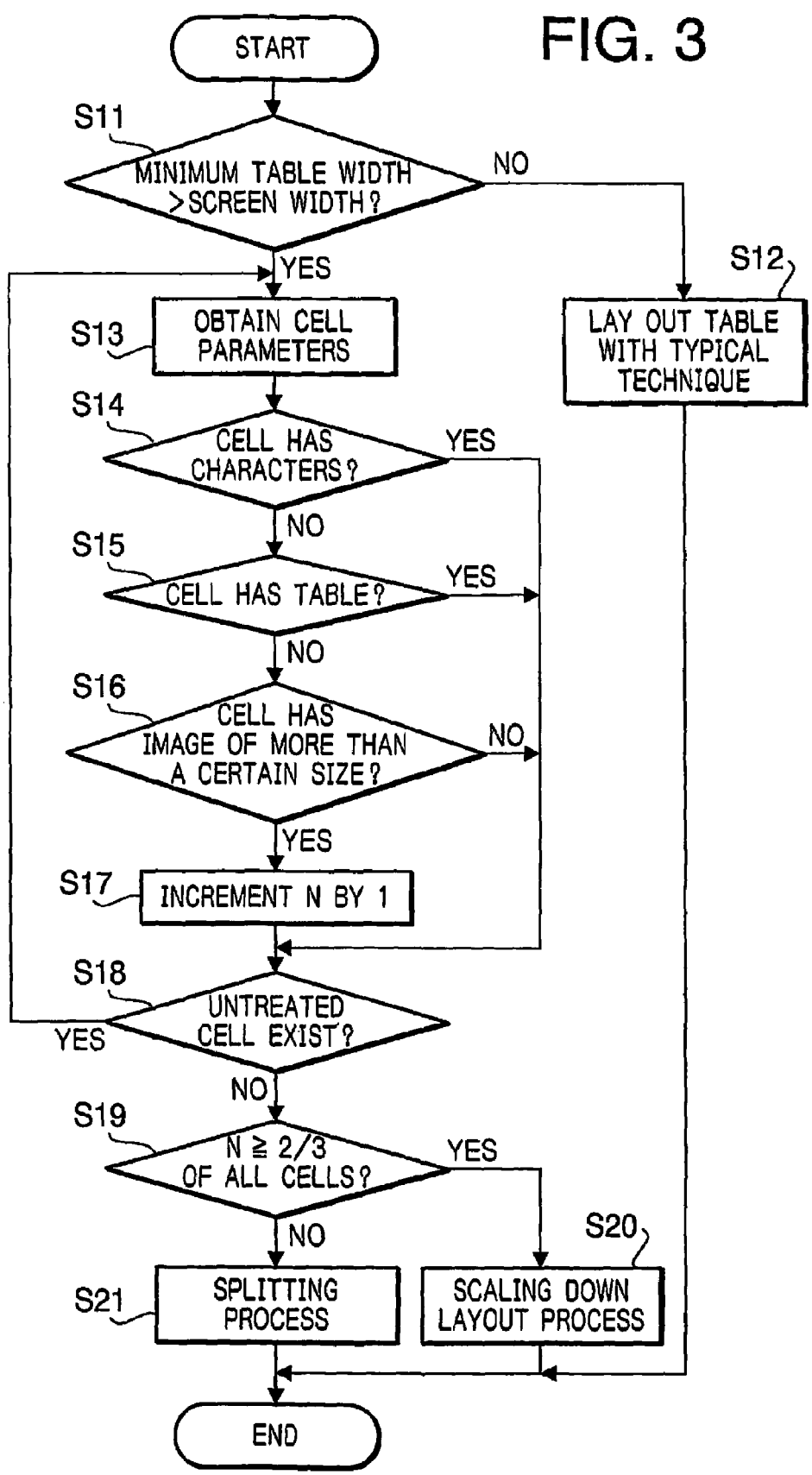
FIG. 3 is a flowchart showing a table-layout process.

FIG. 3 is a flowchart showing the table-layout process. The table-layout process is summarized as follows.

(1) If a table in the contents can be contained in the screen of the portable device 10, the table is laid out in a typical technique and is displayed on the screen of the portable device 10 (step S12).

(2) When the table can not be contained in the screen of the portable device 10:

if the table is a combinational image having partial images, a scaling down layout process (step S20) is performed to scaled down the table in accordance with the screen size of the portable device 10;

if the table is not the combinational image having partial images, a splitting process (step S21) is performed to split and display cells in the table.

The typical technique means a conventional technique to lay out the table in accordance with a size of an area to be used for displaying the table without changing an array of cells in the table. As described in detail later, in this embodiment, such typical technique is used only when the entire table can be contained in the screen of the portable device 10.

Hereafter, the table-layout process will be explained in detail with reference to FIG. 3 through FIG. 14. As shown in FIG. 3, initially, in step S11, a table in the contents is analyzed to calculate a minimum table width. The minimum table width is a minimum number of pixels in the horizontal direction required to display data included in cells of one of the rows of the table. With regard to a row of the table, the minimum table width is defined as the sum of widths of images in cells of the row, a maximum of widths of characters in each cell of the row (i.e., a sum of maximum character widths of all cells of the row), and widths of borders between adjacent cells of the row.

After the minimum table width is calculated, it is determined whether the minimum table width is greater the screen size of 200 pixels (step S11).

Given that a HTML document 40 obtained by the portable device 10 is one shown in FIG. 4. The HTML document 40 is targeted for the personal computer. As shown in FIG. 4, the HTML document 40 includes a table in which each cell is expressed by a mixture of image data and character data.

Figure 5:
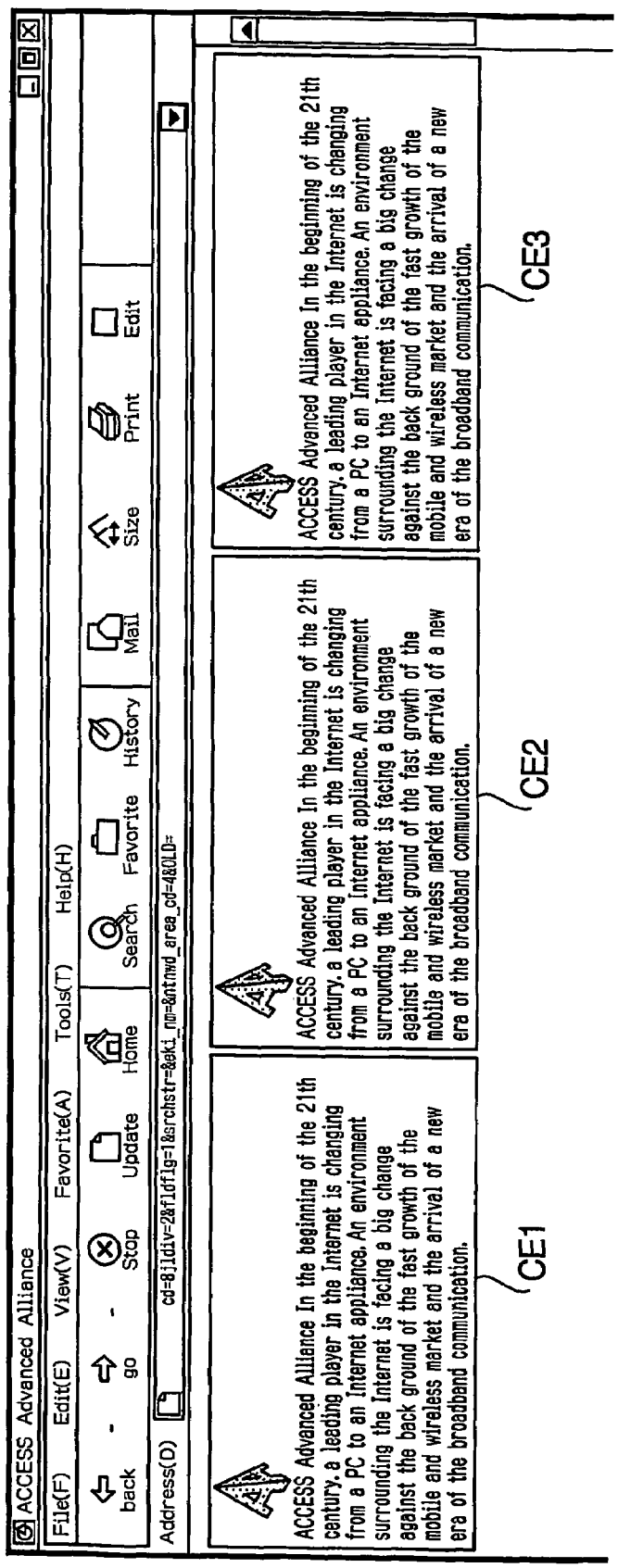
FIG. 5 shows a screen image when the HTML document shown in FIG. 4 is displayed on a screen of a personal computer.

FIG. 5 shows a screen image when the HTML document 40 shown in FIG. 4 is displayed on a screen of the personal computer by a conventional browser. Since the personal computer has a sufficient screen size, three cells CE1, CE2 and CE3, each of which has images and characters, are suitably aligned and displayed horizontally on the screen of the personal computer.

With regard to the HTML document 40, the minimum table width is calculated as follows:

(minimum table width)={(a width of an image)+(a maximum of widths of characters)}×(the number of cells)+α where α represents widths of borders between adjacent cells. Assuming that the width of an image aaa_b.gif is 105 pixels, the minimum table width is larger than 315 (105×3) pixels which is greater than the screen size (200 pixels) of the portable device 10. In this case, it is determined that the minimum table width is larger than the screen size in step S11, and thereafter the table is treated in the splitting process (S21) or the scaling down layout process (S20).

If the minimum table width is smaller than or equal to the screen size of the portable device 10(S11:NO), the table is displayed on the screen of the portable using the typical technique because the table can be contained within the screen size of 200 pixels of the portable device 10 (S12).

A series of steps S13-S19 is a process for determining whether or not the table is a combinational image consisting of a plurality of cells of partial images. By the series of process S13-S19, when the ratio of the number of cells having images to the number of all cells in the table is greater then a predetermined ratio, the table is determined to be the combinational image (S19:YES), and thereafter the table is subjected to the scaling down layout process (S20). When the ratio of the number of cells having images to the number of all cells of the table is not greater than the predetermined ratio, the table is subjected to the splitting process (S21:YES).

In step S13, parameters of a cell required by steps S14, S15 and S16 are obtained. Next, in step S14, it is determined whether or not the cell includes characters. If the cell includes characters (S14:YES), the cell can be regarded as one that does not constitute the combinational image. Then, control proceeds to step S18 to treat a next cell of the table.

If it is determined that the cell does not include characters (S14:NO), control proceeds to step S15 to determine whether or not the cell includes a further table. If the cell includes the further table (S15:YES), the cell can be regarded as one that does not constitute the combinational image. Therefore, in this case, control proceeds to step S18 to treats a next cell.

If it is determined that the cell does not include the further table (S15:NO), control proceeds to S16 to determine whether or not the cell includes an image having a size larger than a predetermined size (for example, a horizontal size of 10 pixels). If the table does not include an image whose size is larger than the predetermined size (S16:NO), control proceeds to step S18 to treats a next cell. If the table includes an image whose size is larger than or equal to the predetermined size, a variable N is increased by one so as to count up the number of cells having images (S17).

In order not to count a cell having an image such as a spacer only used for enhancing the appearance of the table as one of partial images of the combinational image, the variable N is not counted up when a size of the image in the cell is smaller than the predetermined size.

In step S18, it is determined whether an untreated cell remains or not. When the untreated cell remains (S18:YES), control returns to S13 to treat the untreated cell. When all of the cells in the table are subjected to the series of processes S13-S17 (S18:NO), control proceeds to step S19 to determine whether the ratio of the number of cells of images to the number of all cells of the table (i.e., the ratio of N to all cells of the table) is greater than or equal to 2/3.

When the ratio is greater than or equal to 2/3 (S19:YES), the table is regarded as the combinational image having the partial images and is subjected to the scaling down layout process (S20) in which the table, i.e., a relatively large image as the combinational image, is scaled down to display on the screen of the portable device. When the ratio is smaller than 2/3 (S19:NO), the table is not regarded as the combinational image and is subjected to the splitting process (S21) in which the table is split by a cell and is displayed on the screen of the portable device 10.

It should be noted that, although in this embodiment the value 2/3 is used as the predetermined ratio to determine whether the table is the combinational image or not, another value may be used as the predetermined ratio.

As described above, in the table-layout process of FIG. 3, if the following three conditions are satisfied, a cell is regarded as a partial image that constitutes the combinational image.

(1) The cell does not include characters.
(2) The cell does not include a table.
(3) An image in the cell is larger than or equal to the predetermined size.

Next, the splitting process (S21) is described in detail. The table is split by a cell in the splitting process S21 in accordance with the following algorithm.

(a1) One of a row of the table (for example, the top row) is selected as a target row.
(a2) Cells of the target row capable of being aligned within the screen width of the display 13 are aligned horizontally on the screen of the display 13. That is, cells of the target row capable of being contained in the screen width of 200 pixels are horizontally aligned on the screen of the portable device 10.
(a3) Remaining cells that can not be aligned in a horizontal direction on the screen of the portable device 10 are subjected to the above rule (a2) to align the remaining cells in a different row (for example, a next row) on the screen of the portable device 10.
(a4) After the processes of (a2) and (a3) are finished with regard to the target row of the table, another row of the table is subjected to the processes of (a1) through (a3).

In the above processes of (a1) through (a4), the table is displayed on the screen with each cell reflecting its data of modifiers such as a border and a background color.

Figure 6A:
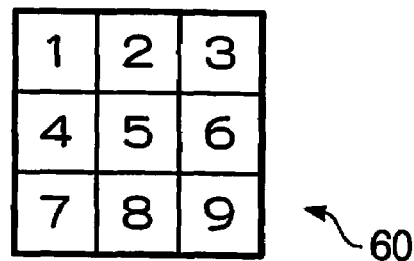
FIG. 6A shows an example of a structure of a table.

If a target table 60 is one which has a structure shown in FIG. 6A, the target table 60, which is an array of 3×3 cells having the same size, is treated as follows. Given that only two cells of the target table 60 can be aligned horizontally in the screen width of 200 pixels.

Figure 6B:
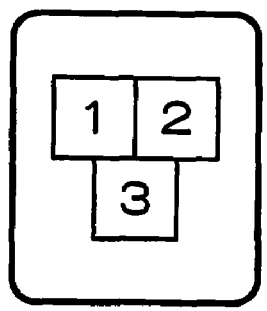
FIG. 6B shows an example of a screen image when cells of a top row of the table shown in FIG. 6A are aligned by the table-layout process.

When a top row of the target table 60 is subjected to the splitting process (S21), cells of the top row are displayed as indicated in FIG. 6B. As shown in FIG. 6B, by the splitting process S21, a remaining cell (a box numbered 3 in FIG. 6B) is displayed at a central position of a next row on the screen of the portable device. Although, in an example of FIG. 6B, the remaining cell 3 is located at the central position in the next row, the remaining cell 3 may be positioned in the next row at another position (for example, a right portion or a left portion of the screen).

Figure 6C:
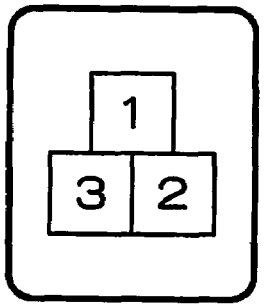
FIG. 6C shows another example of a screen image when cells of a top row of the table shown in FIG. 6A are aligned by the table-layout process.
Figure 6D:
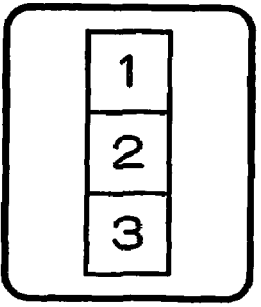
FIG. 6D shows another example of a screen image when cells of a top row of the table shown in FIG. 6A are aligned by the table-layout process.

Although in this embodiment the splitting process S21 operates so that the top row of the target table 60 is displayed on the screen as indicated in FIG. 6B, the splitting process may be configured to display the top row of the table as indicated in FIG. 6C or FIG. 6D. In an example of FIG. 6C, only the cell 1 is displayed on a top row of the screen, and the cells 2 and 3 are aligned in a next row on the screen. In an example of FIG. 6D, the cells 1-3 are aligned vertically on the screen. In each of the examples of FIGS. 6B-6D, each cell reflects its data of modifiers such as a border and a background color.

Figure 7:
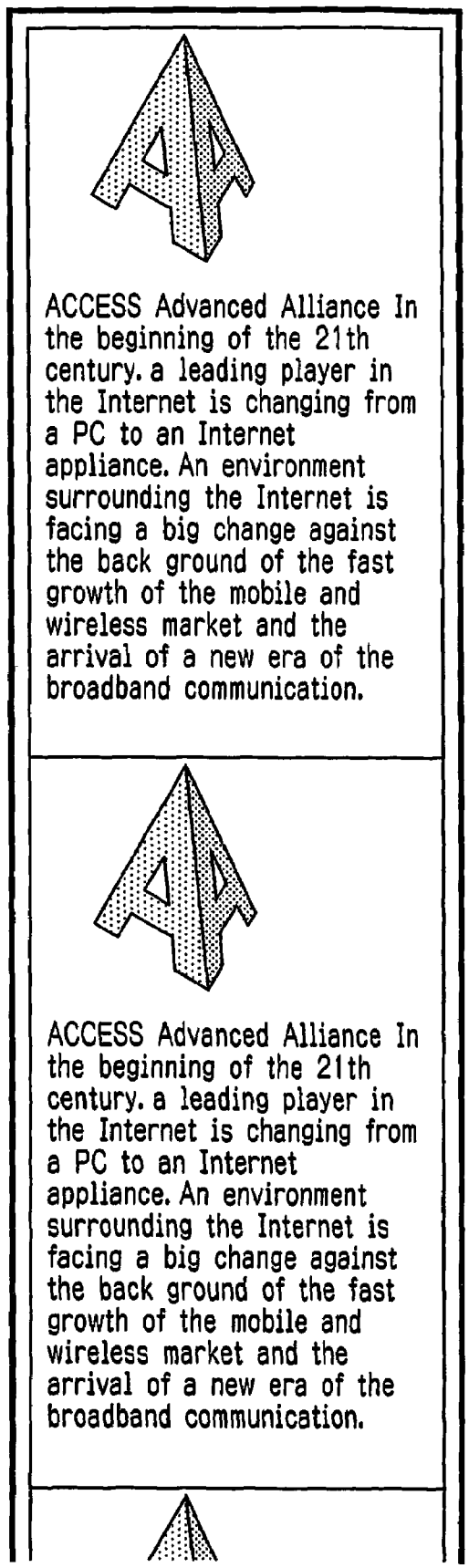
FIG. 7 is an example of a screen image as a result of a splitting process in which the HTML document shown in FIG. 4 is treated.

FIG. 7 is an example of a screen image as a result of the splitting process S21 in which the HTML document 40 shown in FIG. 4 is treated. In this example, since each cell has a relatively wide width, the three cells are aligned vertically on the screen with each cell reflecting its data of modifiers.

Figure 8:
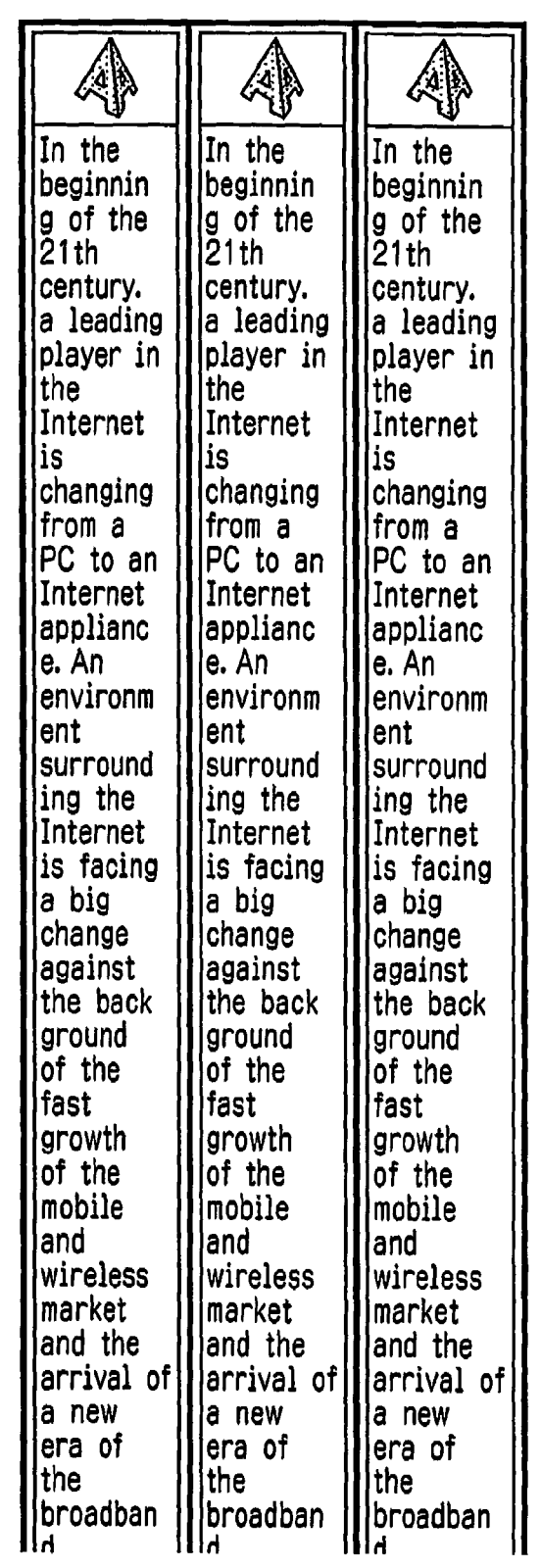

Each of FIGS. 8 and 9 shows a comparative example of a screen image of the HTML document 40 of FIG. 4 treated by another process for comparing with the example of the result of the splitting process S21 according to the embodiment. FIG. 8 is an example in which each cell is scaled down in a horizontal direction so that all the three cells can be aligned horizontally. Since, as can be seen from FIG. 8, the width of each cell is scaled down considerably, the number of carriage returns is considerably increased in comparison with the example of FIG. 7. Therefore, the screen image of FIG. 8 is difficult for the user to read.

FIG. 9 is an example in which all of the cells in a target row of the table are aligned vertically on the screen without exception. The screen image of the FIG. 9 is less suitable than the screen image of FIG. 4 because the cells shown in FIG. 9 have lost representation by data of modifiers.

Since, according to an algorithm of FIG. 9, the cells are aligned vertically without exception even if two or more cells can be aligned horizontally on the screen of the portable device, significance of a two-dimensional array of the target table is lost.

Hereafter, a variation of the above mentioned splitting process (S21) will be described. In the above mentioned splitting process (S21), cells of the target row capable of being aligned within the screen width of the display 13 are determined, and the remaining cells are aligned on the next row. By contrast, in this variation, cells of the target row capable of being aligned within the screen width of the display 13 are determined as in the case of the splitting process of (a1) through (a4). Then, the remaining cells are also aligned to a current row on the display 13 if the remaining cells satisfy a predetermined condition.

An algorithm of this variation is as follows.
(d1) One of a row of the table (for example, the top row) is selected as a target row.
(d2) With regard to the cells of the target row, cells that are capable of being aligned within the screen width (e.g., 200 pixels) of the display 13 are determined.
(d3) After the cells capable of being aligned within the screen width are determined, a sum of widths of the determined cells is calculated. Then, it is determined whether the sum is smaller than a certain width (e.g., 20 pixels) which is smaller than the screen width (i.e., 200 pixels).
  (d3-1) When it is determined that the sum (calculated in the step (d3)) is smaller than the certain width (20 pixels), at least one of remaining cells, which have been determined in the step (d3) that they can not be aligned in the current row of the display 13, is also targeted for aligning on the current row on the display 13.
  (d3-2) When it is determined that the sum (calculated in the step (d3)) is not smaller than the certain width (20 pixels), the remaining cells are aligned on a next row on the display 13 in accordance with the steps (d2) and (d3).
(d4) After the step (d3-1) is finished, a sum of width of remaining cells that can not be aligned on the current row of the display 13 is calculated. Then, it is determined whether the sum is smaller than the certain width (20 pixels).
(d5) When it is determined that the sum (calculated in the step (d4)) is smaller than the certain width (20 pixels), at least one of remaining cells, which have been determined at the step (d4) that they can not be aligned in the current row of the display 13, is also targeted for aligning on the current row of the display 13. When it is determined that the sum (calculated in the step (d4)) is not smaller than the certain width (20 pixels), the remaining cells are aligned on the next row of the display 13.

It is understood that, since a sum of widths of the cells, which the above algorithm finally determined that they can be aligned on the current row of the display 13 by, is larger than the screen width of the display 13, the cells are scaled down so as to contain the cells within the screen width of the display 13.

Figure 10A:
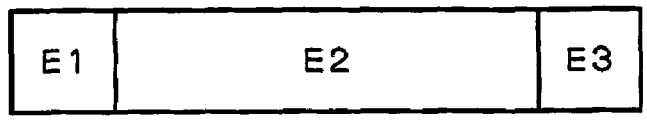
FIG. 10A schematically shows an example of a row of a table to be processed.
Figure 10B:
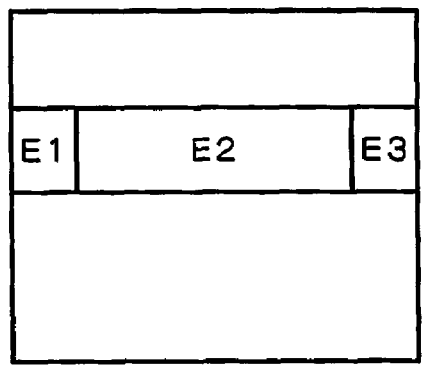
FIG. 10B shows a screen image in a case where a target row shown in FIG. 10A is subjected to an algorithm (d1)-(d5)
Figure 10C:
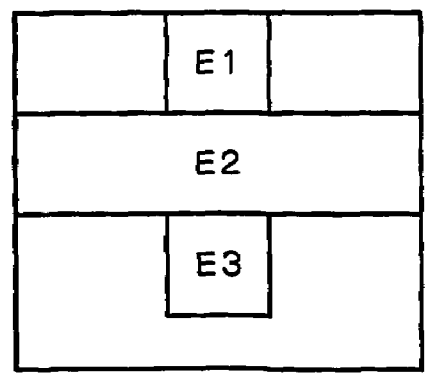
FIG. 10C shows a screen image in a case where a target row shown in FIG. 10A is subjected to an algorithm (a1)-(a4)

An example of a screen image as a result of the above mentioned algorithm ((d1)-(d5)) will be shown with reference to FIGS. 10A-10C. FIG. 10A schematically shows an example of a row of a table to be processed. As show in FIG. 10A, the target row includes a cell E1 which is smaller than the certain width (20 pixels), a cell E2 and a cell E3 which is also smaller than the certain width (20 pixels).

As show in FIG. 10A, only the cell E1 can be contained within the screen width (200 pixels). However, by the steps (d3) and (d3-1), it is determined that the cell E2 is also aligned on the current row of the display 13 because the cell E1 is smaller than the certain width (20 pixels). Since a sum of widths of the cells E1 and E2 is larger than the certain width, it is determined by the steps (d1) through (d3-1) that only the cells E1 and E2 are aligned on the current row of the display 13.

However, according to the steps (d4) and (d5), the remaining cell E3 is also targeted for aligning on the current row of the display 13. Since the cells E1, E2 and E3 are finally targeted for aligning on the current row of the display 13, the cells E1-E3 are scaled down so as to contain the cells within the screen width of the display 13.

FIG. 10B shows a screen image in a case where the target row shown in FIG. 10A is subjected to the algorithm (d1)-(d5) and is displayed on the display 13. As a comparative example, a screen image in a case where the target row shown in FIG. 10A is subjected to the algorithm (a1)-(a4) and is displayed on the display 13 is shown in FIG. 10C. As shown in FIG. 10C, according to the algorithm (a1)-(a4), the cells E1-E3 are split and displayed on the display 13 vertically.

In the above mentioned splitting process and the variation thereof, the table is treated for each row, and, with regard to a target row, the determination step (e.g., (a2) and (d2)) is performed with respect to each cell. In place of performing such a determination step with respect to each cell, the determination step can be performed with respect to a column in which a plurality of cells are aligned vertically.

For example, when a width of a certain column of the table is smaller than a certain width (e.g., 20 pixels), it may be determined that splitting of cells is inhibited between the certain column and an adjacent column on the left side and between the certain column and an adjacent column on the right side. With this method, it becomes unnecessary to perform the determination step with respect to each cell. The value of the above mentioned certain width (i.e., 20 pixels) may be changed in accordance with a width of a containing block designated in the Web contents.

Next, the scaling down layout process S20 is described in detail. The scaling down layout process S20 operates in accordance with the following algorithm.
(b1) Columns of a target table are scaled down by the same scaling factor in accordance with a size of a displaying area (e.g., the screen width of 200 pixels in this embodiment) in which the target table is to be displayed. That is, the width of each cell is determined under a condition in which the table must be contained in the displaying area.
(b2) Since the width of the cell is determined, data in each cell is laid out as follows.
  (b2-1) If data of the cell is character data, characters in the cell are folded (i.e., linefeed codes and/or carriage return codes are inserted in the characters) so that the characters can be displayed in the horizontal direction within the newly determined cell width.
  (b2-2) If data of the cell is image data, an image in the cell is scaled down so that the image can be contained in the horizontal direction of the newly determined cell width.
  (b2-3) If data of the cell is data of another table (a second table), the second table is subjected to the above processes of (b1) and (b2). In this case, the newly determined cell width is regarded as the size of the displaying area of the process (b1) for the second table.
(b3) A height of each cell can be determined by the above processes up to (b2). A height of a certain row of the target table can be determined as a maximum of all heights of cells included in the certain row of the target table. Also, a height of the table is the sum of the determined height of each row of the table.

Figure 12:
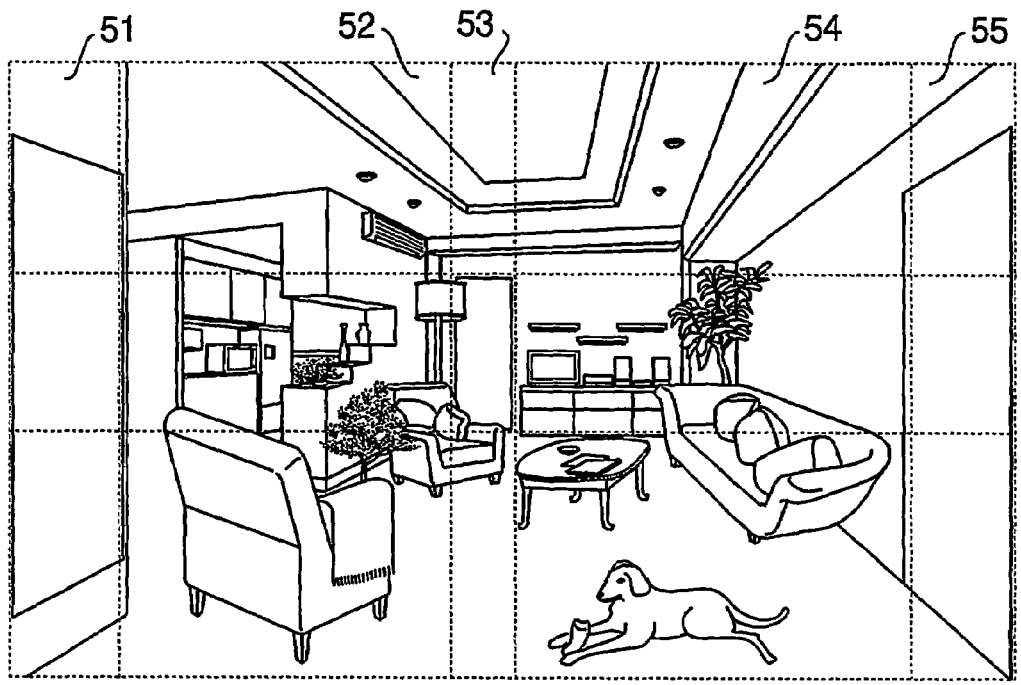
FIG. 12 is a screen image of the contents shown in FIG. 10 in a case where the contents are displayed on a screen of a personal computer.

FIG. 11 is an example of contents 70 including a table as a combinational image. FIG. 12 is a screen image of the contents 70 shown in FIG. 11 in a case where the contents 70 are displayed on a screen of a personal computer by the conventional browser. As shown in FIG. 11, the contents 70 include the table having an array of 5×3 cells of partial images. For example, partial images 51, 52, 53, 54 and 55 shown in FIG. 12 correspond to image data of a1. gif, a2. gif, a3. gif, a4. gif and a5. gif, respectively.

If the contents 70 shown in FIG. 11 are subjected to the table-layout process of FIG. 3, the contents 70 are determined to be the combinational image having partial images and are processed by the scaling down layout process S20.

Figure 13:
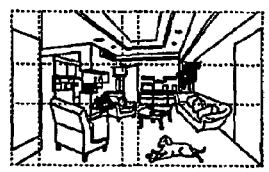
FIG. 13 is a screen image of the contents shown in FIG. 11 in a case where the contents are subjected to the table-layout process and are displayed on the screen of the portable device.

FIG. 13 is a screen image of the contents 70 shown in FIG. 11 in a case where the contents 70 are subjected to the table-layout process of FIG. 3 and are displayed on the screen of the portable device 10.

According to the table-layout process of FIG. 3 of this embodiment, if the table is configured as the combinational image, the combinational image is scaled down in accordance with the screen size of the portable device 10. Therefore, according to the table-layout process of FIG. 3, the contents 70 targeted for the personal computer can be displayed on the screen of the portable device 10 without losing the significance that the two-dimensional array of the contents 70 has.

Figure 14:
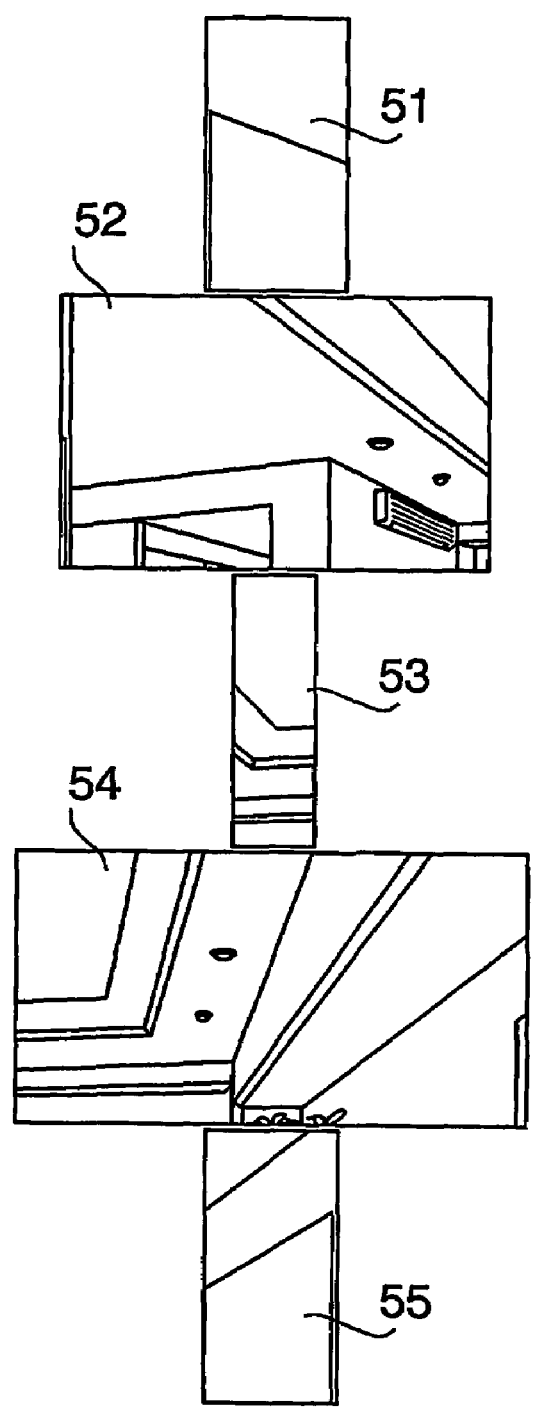
FIG. 14 is a comparative example of a screen image when cells of the contents of FIG. 11 are subjected to a process in which all of the cells are aligned vertically on the screen of the portable device 10 without exception.

FIG. 14 is a comparative example of a screen image for comparing with the screen image shown in FIG. 13. In this example of FIG. 14, cells of the contents 70 of FIG. 11 are subjected to a process in which all of the cells are aligned vertically on the screen of the portable device 10 without exception. As can be seen from FIG. 14, in this comparative example, the significance of a two-dimensional array of the table is lost.

Although, in the first embodiment, the present invention has been described in considerable detail, variables of the first embodiment are possible.

For example, in the determining step S11 of the table-layout process shown in FIG. 3, the target table is subjected to the series of processes of S13-S21 only when the minimum table width is determined to have a size larger than the screen width (200 pixels) of the portable device 10. However, when at least one of the following criteria C1, C2 and C3 is satisfied, the target table may be subjected to the series of processes of S13-S21 even if the minimum table width is determined to have a size less than or equal to the screen width of the portable device 10.

C1. The number of carriage returns of characters in a cell becomes greater than a predetermined value when the table is subjected to the step S12 using the typical technique or when cells of a row of the table are minimized.

C2. The length of a cell in a vertical direction becomes greater than a predetermined value (or a ratio of the vertical size to the horizontal size of a cell becomes grater than a predetermined ratio) when the table is subjected to the step S12 using the typical technique or when cells of a row of the table are minimized.

C3. The width of a cell including characters becomes less than or equal to a certain value when the table is subjected to the step S12 or when cells of a row of the table are minimized.

If the criterion C1 or C2 is satisfied, the table may become hard to read for the user because the length of a cell in the vertical direction becomes too long. For this reason, the criterions C1 and C2 are adopted so that the table is subjected to the splitting process S21 when the criterion C1 or C2 is satisfied.

If the criterion C3 is satisfied, the width of the cell including characters may become too small to read the characters in the cell. For this reason, the criterion C3 is adopted so that the table is subjected to the splitting process S21 when the criterion C3 is satisfied.

Second Embodiment

A second embodiment of the invention will be described. In contrast to the first embodiment in which a table is subjected to the table-layout process, in the second embodiment a frameset is subjected to the table-layout process of FIG. 3.

Since a block diagram of a portable device, a functional block diagram of a browser, and a table-layout process according to the second embodiment are substantially the same as those of the first embodiment, the second embodiment is described with reference to FIGS. 1, 2 and 3, and explanations of FIGS. 1-3 will not be repeated.

More specifically, if contents targeted for the personal computer contain a frameset bracketed by tags <frameset> and </frameset>, the frameset is converted to a table, and thereafter the table is subjected to the table-layout process of FIG. 3. That is, according to the second embodiment, the frameset is displayed on the screen of the portable device 10 without losing the significance that a linear array or a two-dimensional array of the frameset has.

Hereafter, a conversion algorithm for converting a frameset to a table will be described.

In order to convert the frameset to the table (i.e., in order to convert parameters for the frameset to parameters for the table), the following rules are used.

R1. <FRAMESET>→[</TD>][</TR><TR>][<TD>]<TABLE><TBODY><TR>

R2. </FRAMESET>→</TR></TBODY></TABLE>

R3. <FRAME src="url" name="name_str">→[</TD>][</TR><TR>]<TD><Ahref="url">name_str</A></TD>

In the above rules R1-R3, the following supplemental rules are adopted.

[<TD>] and [</TD>] are used when the frameset is nested.

[</TR><TR>] is used on an as needed basis to demarcate columns based on information of a "frameset cols" attribute.

If a name attribute does not exist, "url" is used in place of "name_str".

Attributes <TABLE width=100% border=1 frames=void rules=all cellspacing=0><TD style="background-color: #ccf0ff; border-width: 1; border-color: white;"> are used as modifiers.

Here, an example in which a frameset is converted to a table will be described.

(Frameset before the conversion)

<FRAMESET cols = "1*, 2*, 3*">
<FRAME src = "1.htm" name = left>
<FRAMESET rows = "1*, 2*, 3*">
<FRAME src = "2-1.htm">
<FRAME src = "2-2.htm">

-continued (Frameset before the conversion)

<FRAME src = "2-3.htm">
</FRAMESET>
<FRAME src = "3.htm" name = right>
</FRAMESET>

(Table after the conversion)

<TABLE><TBODY><TR>
<TD><A href = "1.htm">left</A></TD>
<TD><TABLE><TBODY><TR>
<TD><A href = "2-1.htm">2-1.htm</A></TD>
</TR><TR><TD><A href = "2-2.htm">2-2.htm</A></TD>
</TR><TR><TD><A href = "2-3.htm">2-3.htm</A></TD>
<TR></TBODY></TABLE>
</TD><TD><A href = "3.htm">right</A></TD>
</TR></TBODY></TABLE>

In the "table after the conversion", attributes for modification are omitted for the sake of simplicity.

By treating the table converted by the above conversion algorithm in the table-layout process of FIG. 3, the frameset can be targeted for the splitting process S21. Therefore, according to the second embodiment, even if the contents targeted for the personal computer include the frameset, the contents can be displayed on the portable device 10 without losing the significance that the linear array or the two-dimensional array of the frameset has.

Figure 15:
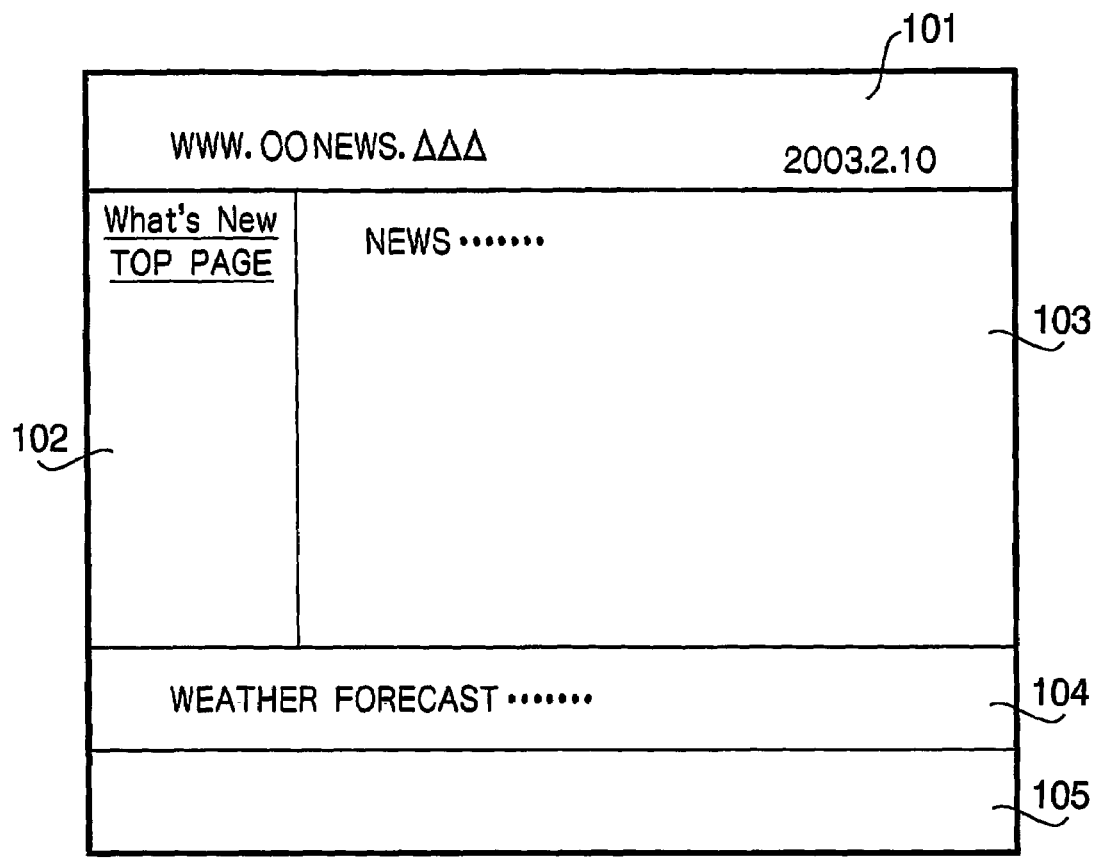
FIG. 15 is an example of a screen image in a case where contents targeted for the personal computer are displayed on a screen of the personal computer.

FIG. 15 is an example of a screen image in a case where contents targeted for the personal computer are displayed on a screen of the personal computer by the conventional browser. In the example of FIG. 15, the frameset includes a frame 101 of "topmain", a frame 102 of "menu", a frame 103 of "main", a frame 104 of "weather", and a frame 105 of "banner".

Figure 16:
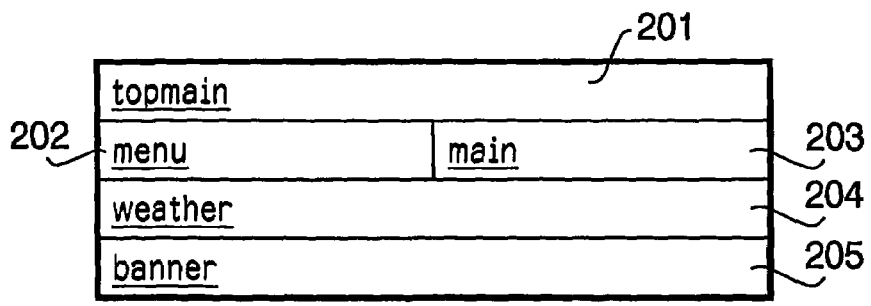
FIG. 16 shows a screen image in a case where a frameset shown in FIG. 15 is converted to a table by a conversion algorithm and is displayed on the screen of the portable device.

FIG. 16 shows a screen image in a case where the frameset shown in FIG. 15 is converted to the table in accordance with the above conversion algorithm and is laid out by the table-layout process on the screen of the portable device 10. Frame portions of 201, 202, 203, 204 and 205 of FIG. 16 respectively correspond to the frames of 101, 102, 103, 104 and 105 of FIG. 15. When the user clicks one of anchors of "topmain", "menu", "main", "weather" and "banner" on the screen image of FIG. 16, detailed information thereof is obtained and displayed.

Since the frameset is displayed on the screen of the portable device 10 as indicated in FIG. 16, a frame switching can be made relatively easily by operating, for example, the up-and-down key of the portable device 10. There is no necessity to provide a special key such as a frame switching key with the portable device 10. It is understood from the FIG. 16 that the user can select one of anchors of "topmain", "menu", "main", "weather" and "banner" by simply operating the up-and-down key.

It should be noted that, in the example of the screen image of FIG. 16, the significance that the two-dimensional array of the original frameset has is not lost.

Although the present invention has been described in considerable detail with reference to certain preferred embodiments thereof, other embodiments are possible.

For example, the above mentioned algorithms or rules for suitably displaying the table or frameset targeted for the personal computer on the screen of the portable device without losing the significance that the linear array or the two-dimensional array of the table or frameset has can be applied to various data in contents having a linear or a two-dimensional array.

Although, in the above mentioned embodiments, the table-layout process is implemented on the mobile phone to display the contents targeted for the personal computer on the screen of the mobile phone, the table-layout process can be implemented on a terminal device having smaller screen size to display contents targeted for a device having a larger screen size on the screen of the terminal device having the smaller screen size. For example, the table-layout process of the embodiment may be implemented on a mobile phone to display contents targeted for an Internet TV (television) or a TV for data broadcasting having a wide and high-resolution screen on a screen of the mobile phone.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

The invention claimed is:

1. A method of laying out contents targeted for a first device having a first screen size on a screen of a second device having a second screen size smaller than the first screen size, comprising:
analyzing a table defined by a tag <table> in the contents to determine a table width of the table in accordance with a predetermined criterion; and
performing in response to a result of said analyzing step one of layout operations of:
(p1) laying out the table using a typical technique in accordance with the second screen size, and
(p2) laying out a row of cells in the table so that at least two cells arranged adjacently in a horizontal direction in the row of the table are aligned horizontally on the screen of the second device based on a predetermined algorithm,
wherein the predetermined criterion includes a first criterion that whether or not a condition:
(a minimum table width)>(a width of the screen of the second device) is satisfied, the minimum table width of the table being a width of a row in the table when cells of the row of the table is minimized,
wherein the predetermined criterion further includes a second criterion that a number of carriage returns of characters in at least one of cells of a row of the table is greater than a certain value when the cells of the row of the table are minimized,
wherein when the first criterion is not satisfied, the operation of (p1) is performed,
wherein when the first criterion is satisfied, the operation (p2) is performed, and
wherein when the second criterion is satisfied, the operation (p2) is performed even if the first criterion is not satisfied.

2. The method according to claim 1,
wherein the layout operations further includes:
(p3) scaling down the table configured to be a combinational image having a plurality of partial images so that the combinational image can be contained in the screen of the second device at least in a horizontal direction.

3. The method according to claim 2,
wherein when the first criterion is satisfied, one of the operations of (p2) and (p3) is performed.

4. The method according to claim 3,
wherein when the second criterion is satisfied, one of the operations of (p2) and (p3) is performed even if the first criterion is not satisfied.

5. The method according to claim 2,
wherein the operation (p3) includes:
(b1) scaling down cells of the table by the same scaling factor in accordance with the second screen size, and
(b2) scaling down each of partial images of the cells of the table in accordance with a width of a corresponding scaled down cell.

6. The method according to claim 1,
wherein the predetermined algorithm includes operations of:
(a1) aligning the at least two cells arranged adjacently in the horizontal direction in the row of the table on a row of the screen of the second device,
(a2) aligning remaining cells of the at least two sells, that can not be aligned on the row of the screen of the second device, on another row of the screen of the second device, and
(a3) performing the operations of (a1) and (a2) with respect to all rows of the table.

7. The method according to claim 1, further comprising: converting in advance a frameset to a table in accordance with a predetermined conversion algorithm if the frameset exists in the contents.

8. The method according to claim 1, further comprising: obtaining in advance the contents through a network.

9. The method according to claim 1, further comprising: obtaining in advance the contents through the Internet.

10. The method according to claim 1, wherein the contents includes a document described by a markup language.

11. A method of laying out contents targeted for a first device having a first screen size on a screen of a second device having a second screen size smaller than the first screen size, comprising:
analyzing a table defined by a tag <table> in the contents to determine a table width of the table in accordance with a predetermined criterion; and
performing in response to a result of said analyzing step one of layout operations of:
(p1) laying out the table using a typical technique in accordance with the second screen size, and
(p2) laying out a row of cells in the table so that at least two cells arranged adjacently in a horizontal direction in the row of the table are aligned horizontally on the screen of the second device based on a predetermined algorithm,
wherein the predetermined criterion includes a first criterion that whether or not a condition:
(a minimum table width)>(a width of the screen of the second device) is satisfied, the minimum table width of the table being a width of a row in the table when cells of the row of the table is minimized,
wherein the predetermined criterion further includes a third criterion that a ratio of a vertical size to a horizontal size of at least one of cells of a row of the table is greater than a certain ratio when the cells of the row of the table are minimized,
wherein when the first criterion is not satisfied, the operation of (p1) is performed,
wherein when the first criterion is satisfied, the operation (p2) is performed, wherein when the third criterion is satisfied, the process (p2) is performed even if the first criterion is not satisfied.

12. The method according to claim 11, wherein the layout operations further includes:
(p3) scaling down the table configured to be a combinational image having a plurality of partial images so that the combinational image can be contained in the screen of the second device at least in a horizontal direction.

13. The method according to claim 12, wherein when the first criterion is satisfied, one of the operations of (p2) and (p3) is performed.

14. The method according to claim 13, wherein when the third criterion is satisfied, one of the processes of (p2) and (p3) is performed even if the first criterion is not satisfied.

15. A method of laying out contents targeted for a first device having a first screen size on a screen of a second device having a second screen size smaller than the first screen size, comprising:
analyzing a table defined by a tag <table> in the contents to determine a table width of the table in accordance with a predetermined criterion; and
performing in response to a result of said analyzing step one of layout operations of:
(p1) laying out the table using a typical technique in accordance with the second screen size, and
(p2) laying out a row of cells in the table so that at least two cells arranged adjacently in a horizontal direction in the row of the table are aligned horizontally on the screen of the second device based on a predetermined algorithm,
wherein the predetermined criterion includes a first criterion that whether or not a condition:
(a minimum table width)>(a width of the screen of the second device) is satisfied, the minimum table width of the table being a width of a row in the table when cells of the row of the table is minimized,
wherein the predetermined criterion further includes a fourth criterion that a width of at least one of cells having characters in a row of the table is less than or equal to a certain value when the cells of the row of the table are minimized,
wherein when the first criterion is not satisfied, the operation of (p1) is performed,
wherein when the first criterion is satisfied, the operation (p2) is performed,
wherein when the forth criterion is satisfied, the operation (p2) is performed even if the first criterion is not satisfied.

16. The method according to claim 15, wherein the layout operations further includes:
(p3) scaling down the table configured to be a combinational image having a plurality of partial images so that the combinational image can be contained in the screen of the second device at least in a horizontal direction.

17. The method according to claim 16, wherein when the first criterion is satisfied, one of the operations of (p2) and (p3) is performed.

18. The method according to claim 17, wherein when the forth criterion is satisfied, one of the operations of (p2) and (p3) is performed even if the first criterion is not satisfied.

19. A method of laying out contents targeted for a first device having a first screen size on a screen of a second device having a second screen size smaller than the first screen size, comprising:
analyzing a table defined by a tag <table> in the contents to determine a table width of the table in accordance with a predetermined criterion;
performing in response to a result of said analyzing step one of layout operations of:
(p1) laying out the table using a typical technique in accordance with the second screen size,
(p2) laying out a row of cells in the table so that at least two cells arranged adjacently in a horizontal direction in the row of the table are aligned horizontally on the screen of the second device based on a predetermined algorithm, and
(p3) scaling down the table configured to be a combinational image having a plurality of partial images so that the combinational image can be contained in the screen of the second device at least in a horizontal direction; and
determining whether the table is configured to be the combinational image,
wherein the operation (p3) is performed when the table is determined to be the combinational image by said determining step,
wherein, in said determining step, when a ratio of a number of cells having images to a number of all cells of the table is greater than a certain ratio, the table is determined to be the combinational image.

20. A method of laying out contents targeted for a first device having a first screen size on a screen of a second device having a second screen size smaller than the first screen size, comprising:
analyzing a table defined by a tag <table> in the contents to determine a table width of the table in accordance with a predetermined criterion; and
performing in response to a result of said analyzing step one of layout operations of:
(p1) laying out the table using a typical technique in accordance with the second screen size, and
(p2) laying out a row of cells in the table so that at least two cells arranged adjacently in a horizontal direction in the row of the table are aligned horizontally on the screen of the second device based on a predetermined algorithm,
wherein the predetermined criterion includes a first criterion that whether or not a condition:
(a minimum table width)>(a width of the screen of the second device) is satisfied, the minimum table width of the table being a width of a row in the table when cells of the row of the table is minimized,
wherein when the first criterion is not satisfied, the operation of (p1) is performed,
wherein when the first criterion is satisfied, the operation (p2) is performed,
wherein the minimum table width is a sum of widths of images in cells of the row of the table, a maximum of widths of characters in each cell of the row of the table, and widths of borders between adjacent cells of the row of the table.

21. The method according to claim 20, wherein the layout operations further includes:
(p3) scaling down the table configured to be a combinational image having a plurality of partial images so that the combinational image can be contained in the screen of the second device at least in a horizontal direction.

22. The method according to claim 20, wherein when the first criterion is satisfied, one of the operations of (p2) and (p3) is performed.

23. A computer program product comprising a set of instructions stored on a recording medium to be executed by a terminal device, the terminal device executing the instructions functioning as laying out contents targeted for a device having a first screen size on a screen of the terminal device having a second screen size smaller than the first screen size, the computer program product comprising functions of:

obtaining the contents through a network;

analyzing a table defined by a tag <table> in the contents to determined a table width of the table in accordance with a predetermined criterion; and performing, in response to a result of said analyzing, one of layout operations of:

(p1) laying out the table using a typical technique in accordance with the second screen size, and (p2) laying out a row of cells in the table so that at least two cells arranged adjacently in a horizontal direction in the row of the table are aligned horizontally on the screen of the terminal device based on a predetermined algorithm, wherein the predetermined criterion includes a first criterion that whether or not a condition:

(a minimum table width)>(a width of the screen of the terminal device) is satisfied, the minimum table width of the table being a width of a row in the table when cells of the row of the table is minimized, wherein the predetermined criterion further includes a second criterion that a number of carriage returns of characters in at least one of cells of a row of the table is greater than a certain value when the cells of the row of the table are minimized, wherein when the first criterion is not satisfied, the operation of (p1) is performed, wherein when the first criterion is satisfied, the operation (p2) is performed, wherein when the second criterion is satisfied, the operation (p2) is performed even if the first criterion is not satisfied.

24. A terminal device for laying out contents targeted for a device having a first screen size on a screen of said terminal device having a second screen size smaller than the first screen size, comprising:

an analyzing system embodied on a recording medium of the terminal device that analyzes a table defined by a tag <table> in the contents to determined a table width of the table in accordance with a predetermined criterion; and a layout system embodied on the recording medium of the terminal device that performs in response to a result of an analysis of said analyzing system one of layout operations of:

(p1) laying out the table using a typical technique in accordance with the second screen size, (p2) laying out a row of cells in the table so that at least two cells arranged adjacently in a horizontal direction in the row of the table are aligned horizontally on the screen of said terminal device based on a predetermined algorithm, and (p3) scaling down the table configured to be a combinational image having a plurality of partial images so that the combinational image can be contained in the screen of said terminal device at least in a horizontal direction, wherein the predetermined criterion includes a first criterion that whether or not a condition:

(a minimum table width)>(a width of the screen of the terminal device) is satisfied, the minimum table width of the table being a width of a row in the table when cells of the row of the table is minimized, wherein the predetermined criterion further includes a second criterion that a number of carriage returns of characters in at least one of cells of a row of the table is greater than a certain value when the cells of the row of the table are minimized, wherein when the first criterion is not satisfied, the operation of (p1) is performed, wherein when the first criterion is satisfied, the operation (p2) is performed, wherein when the second criterion is satisfied, the operation (p2) is performed even if the first criterion is not satisfied.

25. The terminal device according to claim 24, further comprising an obtaining system embodied on the recording medium of the terminal device that obtains the contents through a network.

26. A computer program product comprising a set of instructions stored on a recording medium to be executed by a terminal device, the terminal device executing the instructions functioning as laying out contents targeted for a device having a first screen size on a screen of the terminal device having a second screen size smaller than the first screen size, the computer program product comprising functions of:

obtaining the contents through a network;

analyzing a table defined by a tag <table> in the contents to determined a table width of the table in accordance with a predetermined criterion; and performing, in response to a result of said analyzing, one of layout operations of:

(p1) laying out the table using a typical technique in accordance with the second screen size, and (p2) laying out a row of cells in the table so that at least two cells arranged adjacently in a horizontal direction in the row of the table are aligned horizontally on the screen of the terminal device based on a predetermined algorithm, wherein the predetermined criterion includes a first criterion that whether or not a condition:

(a minimum table width)>(a width of the screen of the terminal device) is satisfied, the minimum table width of the table being a width of a row in the table when cells of the row of the table is minimized, wherein the predetermined criterion further includes a third criterion that a ratio of a vertical size to a horizontal size of at least one of cells of a row of the table is grater than a certain ratio when the cells of the row of the table are minimized, wherein when the first criterion is not satisfied, the operation of (p1) is performed, wherein when the first criterion is satisfied, the operation (p2) is performed, wherein when the third criterion is satisfied, the process (p2) is performed even if the first criterion is not satisfied.

27. A computer program product comprising a set of instructions stored on a recording medium to be executed by a terminal device, the terminal device executing the instructions functioning as laying out contents targeted for a device having a first screen size on a screen of the terminal device having a second screen size smaller than the first screen size, the computer program product comprising functions of:

obtaining the contents through a network;

analyzing a table defined by a tag <table> in the contents to determined a table width of the table in accordance with a predetermined criterion; and performing, in response to a result of said analyzing, one of layout operations of:
  (p1) laying out the table using a typical technique in accordance with the second screen size, and
  (p2) laying out a row of cells in the table so that at least two cells arranged adjacently in a horizontal direction in the row of the table are aligned horizontally on the screen of the terminal device based on a predetermined algorithm,
wherein the predetermined criterion includes a first criterion that whether or not a condition:
  (a minimum table width)>(a width of the screen of the terminal device) is satisfied, the minimum table width of the table being a width of a row in the table when cells of the row of the table is minimized,
wherein the predetermined criterion further includes a fourth criterion that a width of at least one of cells having characters in a row of the table is less than or equal to a certain value when the cells of the row of the table are minimized,
wherein when the first criterion is not satisfied, the operation of (p1) is performed,
wherein when the first criterion is satisfied, the operation (p2) is performed,
wherein when the forth criterion is satisfied, the operation (p2) is performed even if the first criterion is not satisfied.

28. A computer program product comprising a set of instructions stored on a recording medium to be executed by a terminal device, the terminal device executing the instructions functioning as laying out contents targeted for a device having a first screen size on a screen of the terminal device having a second screen size smaller than the first screen size, the computer program product comprising functions of:
  obtaining the contents through a network;
  analyzing a table defined by a tag <table> in the contents to determined a table width of the table in accordance with a predetermined criterion; and
  performing, in response to a result of said analyzing, one of layout operations of:
    (p1) laying out the table using a typical technique in accordance with the second screen size, and
    (p2) laying out a row of cells in the table so that at least two cells arranged adjacently in a horizontal direction in the row of the table are aligned horizontally on the screen of the terminal device based on a predetermined algorithm,
  wherein the predetermined criterion includes a first criterion that whether or not a condition:
    (a minimum table width)>(a width of the screen of the terminal device) is satisfied, the minimum table width of the table being a width of a row in the table when cells of the row of the table is minimized,
  wherein when the first criterion is not satisfied, the operation of (p1) is performed,
  wherein when the first criterion is satisfied, the operation (p2) is performed,
  wherein the minimum table width is a sum of widths of images in cells of the row of the table, a maximum of widths of characters in each cell of the row of the table, and widths of borders between adjacent cells of the row of the table.

29. A computer program product comprising a set of instructions stored on a recording medium to be executed by a terminal device, the terminal device executing the instructions functioning as laying out contents targeted for a device having a first screen size on a screen of the terminal device having a second screen size smaller than the first screen size, the computer program product comprising functions of:
  obtaining the contents through a network;
  analyzing a table defined by a tag <table> in the contents to determined a table width of the table in accordance with a predetermined criterion; and
  performing, in response to a result of said analyzing, one of layout operations of:
    (p1) laying out the table using a typical technique in accordance with the second screen size,
    (p2) laying out a row of cells in the table so that at least two cells arranged adjacently in a horizontal direction in the row of the table are aligned horizontally on the screen of the terminal device based on a predetermined algorithm, and
    (p3) scaling down the table configured to be a combinational image having a plurality of partial images so that the combinational image can be contained in the screen of the terminal device at least in a horizontal direction; and
  determining whether the table is configured to be the combinational image,
  wherein the operation (p3) is performed when the table is determined to be the combinational image by said determining step,
  wherein, in said determining step, when a ratio of a number of cells having images to a number of all cells of the table is greater than a certain ratio, the table is determined to be the combinational image.

30. A terminal device for laying out contents targeted for a device having a first screen size on a screen of said terminal device having a second screen size smaller than the first screen size, comprising:
  an analyzing system embodied on a recording medium of the terminal device that analyzes a table defined by a tag <table> in the contents to determined a table width of the table in accordance with a predetermined criterion; and
  a layout system embodied on the recording medium of the terminal device that performs in response to a result of an analysis of said analyzing system one of layout operations of:
    (p1) laying out the table using a typical technique in accordance with the second screen size,
    (p2) laying out a row of cells in the table so that at least two cells arranged adjacently in a horizontal direction in the row of the table are aligned horizontally on the screen of said terminal device based on a predetermined algorithm,
  wherein the predetermined criterion includes a first criterion that whether or not a condition:
    (a minimum table width)>(a width of the screen of the terminal device) is satisfied, the minimum table width of the table being a width of a row in the table when cells of the row of the table is minimized,
  wherein the predetermined criterion further includes a third criterion that a ratio of a vertical size to a horizontal size of at least one of cells of a row of the table is grater than a certain ratio when the cells of the row of the table are minimized,
  wherein when the first criterion is not satisfied, the operation of (p1) is performed,
  wherein when the first criterion is satisfied, the operation (p2) is performed,
  wherein when the third criterion is satisfied, the process (p2) is performed even if the first criterion is not satisfied.

31. A terminal device for laying out contents targeted for a device having a first screen size on a screen of said terminal device having a second screen size smaller than the first screen size, comprising:
- an analyzing system embodied on a recording medium of the terminal device that analyzes a table defined by a tag <table> in the contents to determined a table width of the table in accordance with a predetermined criterion; and
- a layout system embodied on the recording medium of the terminal device that performs in response to a result of an analysis of said analyzing system one of layout operations of:
  - (p1) laying out the table using a typical technique in accordance with the second screen size,
  - (p2) laying out a row of cells in the table so that at least two cells arranged adjacently in a horizontal direction in the row of the table are aligned horizontally on the screen of said terminal device based on a predetermined algorithm,
- wherein the predetermined criterion includes a first criterion that whether or not a condition:
  - (a minimum table width)>(a width of the screen of the terminal device) is satisfied, the minimum table width of the table being a width of a row in the table when cells of the row of the table is minimized,
- wherein the predetermined criterion further includes a fourth criterion that a width of at least one of cells having characters in a row of the table is less than or equal to a certain value when the cells of the row of the table are minimized,
- wherein when the first criterion is not satisfied, the operation of (p1) is performed,
- wherein when the first criterion is satisfied, the operation (p2) is performed,
- wherein when the forth criterion is satisfied, the operation (p2) is performed even if the first criterion is not satisfied.

32. A terminal device for laying out contents targeted for a device having a first screen size on a screen of said terminal device having a second screen size smaller than the first screen size, comprising:
- an analyzing system embodied on a recording medium of the terminal device that analyzes a table defined by a tag <table> in the contents to determined a table width of the table in accordance with a predetermined criterion; and
- a layout system embodied on the recording medium of the terminal device that performs in response to a result of an analysis of said analyzing system one of layout operations of:
  - (p1) laying out the table using a typical technique in accordance with the second screen size,
  - (p2) laying out a row of cells in the table so that at least two cells arranged adjacently in a horizontal direction in the row of the table are aligned horizontally on the screen of said terminal device based on a predetermined algorithm,
- wherein the predetermined criterion includes a first criterion that whether or not a condition:
  - (a minimum table width)>(a width of the screen of the terminal device) is satisfied, the minimum table width of the table being a width of a row in the table when cells of the row of the table is minimized,
- wherein when the first criterion is not satisfied, the operation of (p1) is performed,
- wherein when the first criterion is satisfied, the operation (p2) is performed,
- wherein the minimum table width is a sum of widths of images in cells of the row of the table, a maximum of widths of characters in each cell of the row of the table, and widths of borders between adjacent cells of the row of the table.

33. A terminal device for laying out contents targeted for a device having a first screen size on a screen of said terminal device having a second screen size smaller than the first screen size, comprising:
- an analyzing system embodied on a recording medium of the terminal device that analyzes a table defined by a tag <table> in the contents to determined a table width of the table in accordance with a predetermined criterion; and
- a layout system embodied on the recording medium of the terminal device that performs in response to a result of an analysis of said analyzing system one of layout operations of:
  - (p1) laying out the table using a typical technique in accordance with the second screen size,
  - (p2) laying out a row of cells in the table so that at least two cells arranged adjacently in a horizontal direction in the row of the table are aligned horizontally on the screen of said terminal device based on a predetermined algorithm, and
  - (p3) scaling down the table configured to be a combinational image having a plurality of partial images so that the combinational image can be contained in the screen of the terminal device at least in a horizontal direction; and
- determining whether the table is configured to be the combinational image,
- wherein the operation (p3) is performed when the table is determined to be the combinational image by said determining step,
- wherein, in said determining step, when a ratio of a number of cells having images to a number of all cells of the table is greater than a certain ratio, the table is determined to be the combinational image.

* * * * *